(12) United States Patent
Hall et al.

(10) Patent No.: US 10,517,414 B1
(45) Date of Patent: Dec. 31, 2019

(54) HAND-HELD BREWING AND EXTRACTING PIPE FOR COFFEE AND TEA

(71) Applicant: Bripe Inc., Carleton Place, Ontario (CA)

(72) Inventors: Craig Stephen L. Hall, Carleton Place (CA); Timothy James Panek, Mount Morris, MI (US)

(73) Assignee: Bripe Inc., Carleton Place, Ontario (CA)

( * ) Notice: Subject to any disclaimer, the term of this patent is extended or adjusted under 35 U.S.C. 154(b) by 167 days.

(21) Appl. No.: 15/097,652

(22) Filed: Apr. 13, 2016

(51) Int. Cl.
 *A47J 31/00* (2006.01)
 *A47G 19/22* (2006.01)
 *A47J 31/44* (2006.01)

(52) U.S. Cl.
 CPC ........ *A47G 19/2205* (2013.01); *A47J 31/005* (2013.01); *A47J 31/44* (2013.01)

(58) Field of Classification Search
 CPC .... A47J 31/4492; A47J 31/407; A47J 31/005; A47J 31/3628; A47J 31/3633; A47J 31/369; A47J 31/32; A47J 31/14; A47J 31/38; A47J 31/06; A47J 31/402; A47J 31/4403; A47J 31/44; A47J 31/00; A01K 63/06; A47G 19/16; A47G 19/14; A47G 16/2266; A47G 19/2222; A47G 21/18; A47G 10/2205; B65D 3/00
 See application file for complete search history.

(56) References Cited

U.S. PATENT DOCUMENTS

| | | | | |
|---|---|---|---|---|
| 3,102,465 | A * | 9/1963 | Montesano | A47G 19/16 206/0.5 |
| 3,193,388 | A * | 7/1965 | Conrey | A47G 19/16 206/0.5 |
| 5,623,865 | A * | 4/1997 | Sidiropoulos | A47G 19/16 426/77 |
| 7,337,705 | B1 * | 3/2008 | Catena | A47J 31/20 239/33 |
| 8,467,670 | B2 * | 6/2013 | Baston | A47J 31/005 392/444 |

* cited by examiner

*Primary Examiner* — Hong T Yoo
(74) *Attorney, Agent, or Firm* — James Creighton Wray

(57) ABSTRACT

There is described a hand-held brewing and extracting pipe and method for coffee and tea.

17 Claims, 5 Drawing Sheets

HAND-HELD BREWING AND EXTRACTING PIPE FOR COFFEE AND TEA

FIELD OF THE INVENTION

This invention relates to hand-held brewing and extracting apparatus and methods for preparing beverages. In particular, this invention relates to a hand-held brewing and extracting pipe and method for creating a drink of coffee and tea.

BACKGROUND OF THE INVENTION

There are many different ways to make a beverage drink such as coffee or tea.

One can make a beverage by boiling water and adding it to instant coffee or tea leaves or tea bags in a cup.

One could use a standard coffee maker to which cold water is added and heated using electricity.

One could use a "French press" by adding coffee granules, boiling water, and allowing extraction to occur before pressing the granules and pouring your beverage.

Instead of using an electric kettle to boil water, one could use an electric stove or a camp stove to boil water for the purpose.

In all cases, the equipment involved is quite substantial.

It would be desirable to have an apparatus and means for brewing and extracting coffee and tea which is hand-held and which does not require the individual to have a stove and hot water.

SUMMARY OF THE INVENTION

This product is designed as a simple hand-held device to brew coffee or tea on the go. One objective of the invention is to brew a "shot" of good coffee or tea without requiring the individual to have access to a stove or kettle to boil water. The coffee, or tea, are added to the "bowl" and heat is applied using a butane blue flame lighter or candle until the liquid is heated to the desired temperature. The ideal goal is to heat the coffee to 180° C. in under 2 minutes.

DETAILED DESCRIPTION

The invention is modelled from a traditional style of pipe meant for smoking but adapted for use to brew and extract beverages.

Figure 1:
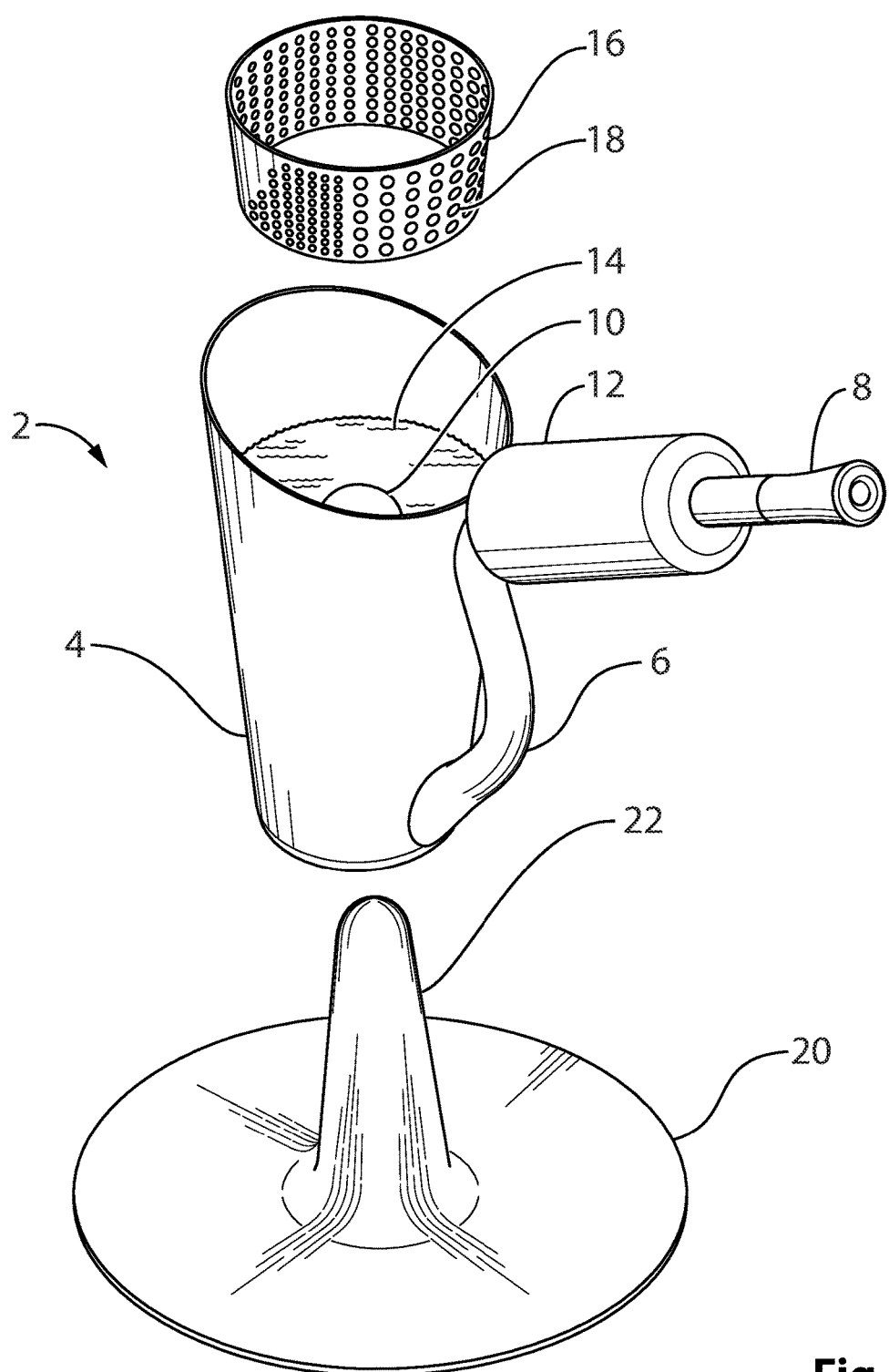
FIG. 1 is a perspective exploded view of the brewing and extracting pipe showing individual components.

Referring to FIG. 1 there is shown the hand-held brewing and extracting pipe 2.

The pipe 2 includes a vessel 4 made of metal and is of generally cylindrical shape in which a beverage is brewed. The top of the vessel 4 is sloped to prevent spillage of the liquid 14 during the brewing process. The vessel 4 must be made of a metal which has a high heat conductivity.

The vessel 4 is formed with a cone 10 which is located centrally in the bottom of the vessel 4.

The liquid 14 used for brewing the beverage is usually water. It will be understood that any non-alcoholic or alcoholic liquid, or combination thereof, could be used. For example, vodka or gin could be used alone or in combination with water.

A straw 6, also made of metal, connects to the vessel 4 near the bottom of the vessel 4 and has an aperture through which the beverage will pass. The straw 6 is preferably made of an identical or similar metal as the vessel 4. The vessel 4 and straw 6 could be made of one-piece construction.

A filter 16 is placed in the bottom of the vessel 4. Preferably the filter 16 is a micro-filter which permits the passage of liquid into the straw 6 but prevents any coffee granules 28 from passing through.

The filter 16 has a plurality of holes 18 which are formed into vertical panels having different diameters of holes 18. The filter 16 can be rotated so that the user can select the diameter of the holes 18 to be used and thereby align those holes 18 with the aperture of the straw 6.

It will be understood that other types of filters could be used. For example, a removable filter could be placed in a generally u-shaped channel at the entrance to the straw 6 where it meets the vessel 4.

Alternatively, the vessel 4 could be constructed with a plurality of holes at the entrance to the straw 6.

A mouthpiece 8 connects to the straw 6 or can be placed over the end of the straw 6. The mouthpiece 8 could be any suitable material but preferably not a heat-conducting metal. The use of a mouthpiece 8 has the advantage of ensuring that the mouth of the user is not in direct contact with the straw 6. This avoids the mouth of the user being burned by the vessel 4 and also means that the mouthpiece 8 does not have a metallic taste.

One or more insulating pieces 12 may be used to enable the user to hold the pipe 2 without getting burned. The insulating piece 12 could be of variable length and size. The insulating piece 12 could be located at some point along the length of the straw 6 so that user could hold the straw 6. Alternatively, or in addition to, another insulting piece (not shown) could be wrapped the vessel 4 so that the entire vessel 4 could be held by the user.

The pipe 2 can be placed at rest on a table or other surface without tipping over.

An optional stand 20 could be used. One example is shown in FIG. 1. The stand 20 has a shaft 22 which corresponds in shape to the cone 10 such that the pipe 2 may rest on the stand 20.

Figure 2:
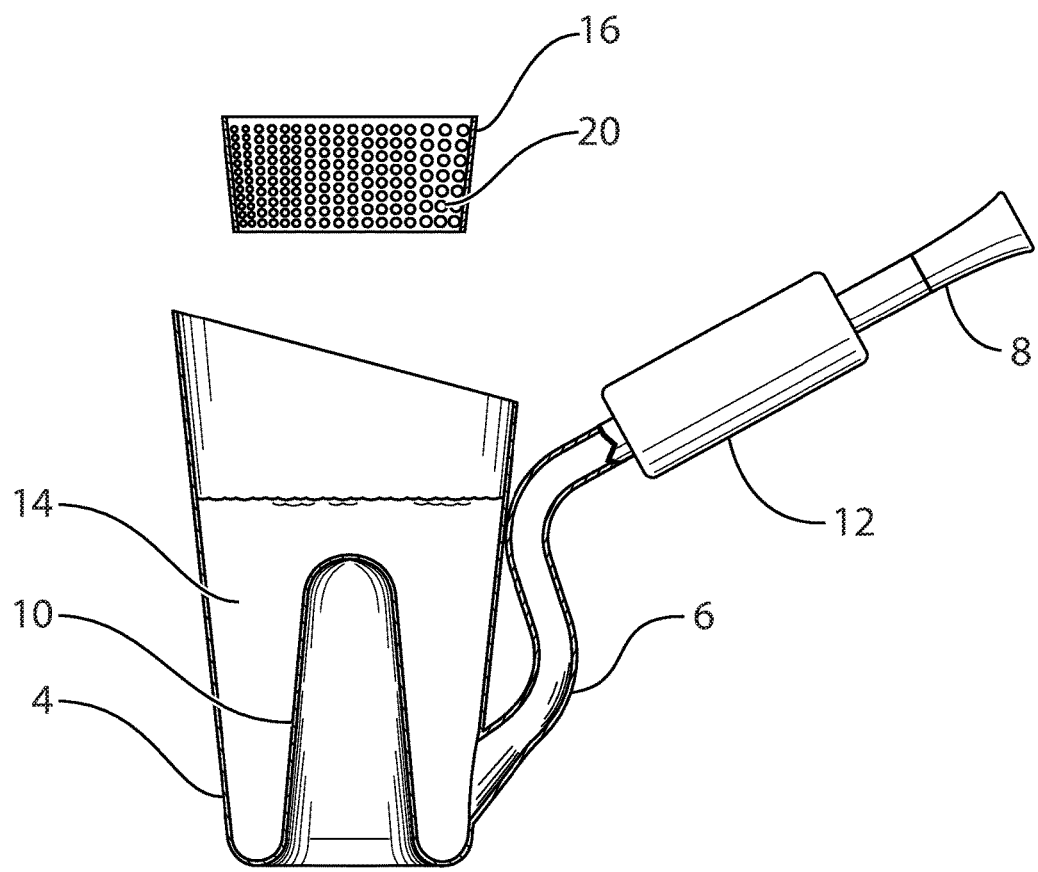
FIG. 2 is a side cut-away view of the brewing and extracting pipe showing the filter removed.

Referring to FIG. 2, the shape and location of the cone 10 can be more easily observed.

Figure 3:
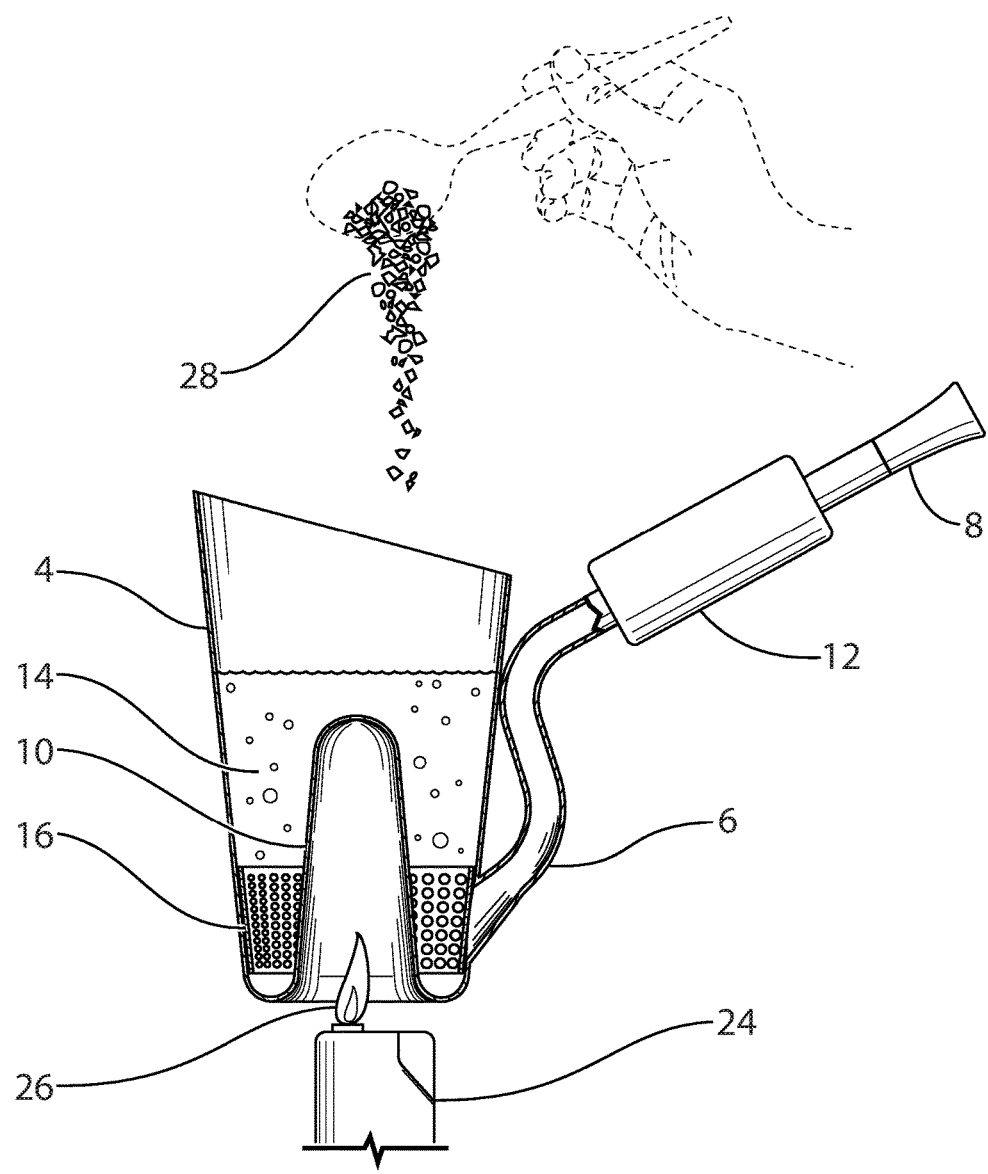
FIG. 3 is a side cut-away view of the brewing and extracting pipe in brewing and extracting mode with the heat source and with the coffee granules being added.

Referring to FIG. 3, there is shown granules 28 of coffee which is added to the pipe 2, either before or after the liquid 14 is poured in the vessel 4. The granules 28 could also be tea leaves or some other suitable item such as cocoa.

A sweetener, such as sugar, could be added if desired.

A heating source 24, such as a butane lighter or candle, is held or placed under the cone 10 to heat the air in the cone 10 and thereby the liquid 14 in the vessel 4.

The shape of the cone 10 has been found to be particularly effective in providing a greater contact area with the flame 26, thereby reducing the time that it takes to heat the liquid 14. However, it will be understood that the cone 10 could be of any shape that similarly provides good contact area with the flame 26.

All of the components of the pipe 2 should be food safe and be able to be easily cleaned.

The operation of the pipe 2 can best be seen with reference to FIG. 3.

The filter 16 is placed inside the vessel 4 and rotated until the desired diameter of holes 18 are aligned with aperture of the straw 6.

Granules 28 of coffee, or tea leaves, are placed inside the vessel 4 and a quantity of liquid 14, usually water, is poured into the top of the vessel 4. Preferably the amount of liquid 14 is between 30-40 ml and the amount of coffee 28 or tea is 7-9 g.

While the liquid 14 could be poured into the vessel 4 before the granules 28 there is a chance that the granules 28 will tend to float on the top of the liquid 14.

Figure 4:
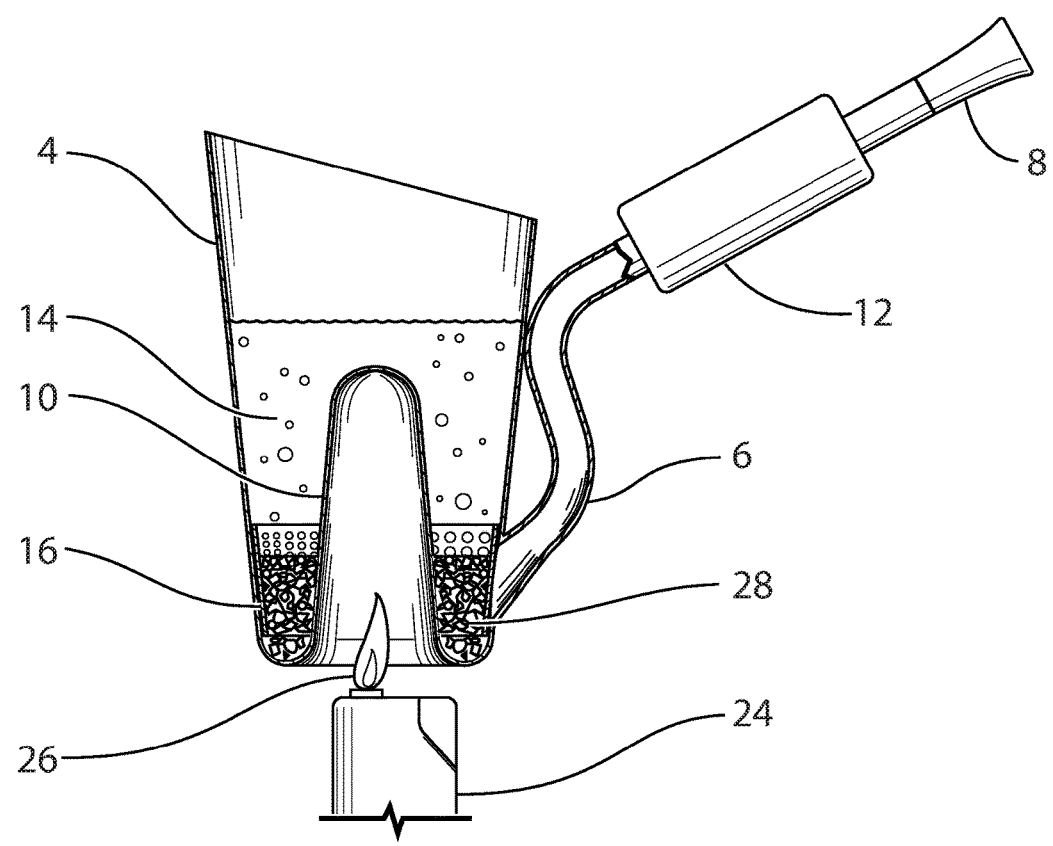
FIG. 4 is a side cut-away view of the brewing and extracting pipe in brewing and extracting mode with the coffee granules already added and the heat source.

Referring to FIG. 4, the liquid 14 in the vessel 4 is heated by means of a heating source 24, such as a butane lighter or candle. For best results, the heating source 24 should be placed immediately underneath the cone 10.

The liquid 14 is brought to a first rolling boil of around 180° C.

The liquid is stirred by means of a spoon or stir stick (not shown).

The liquid 14 is brought to a second rolling boil.

The vessel 4 has a straw 6. Preferably, for a better coffee or tea beverage, the user blows air into the vessel 4 by means of the straw 6. This circulates the liquid 14 with the granules 28. During this process, the liquid 14 is unlikely to spill because of the sloped design of the vessel 4.

Figure 5:
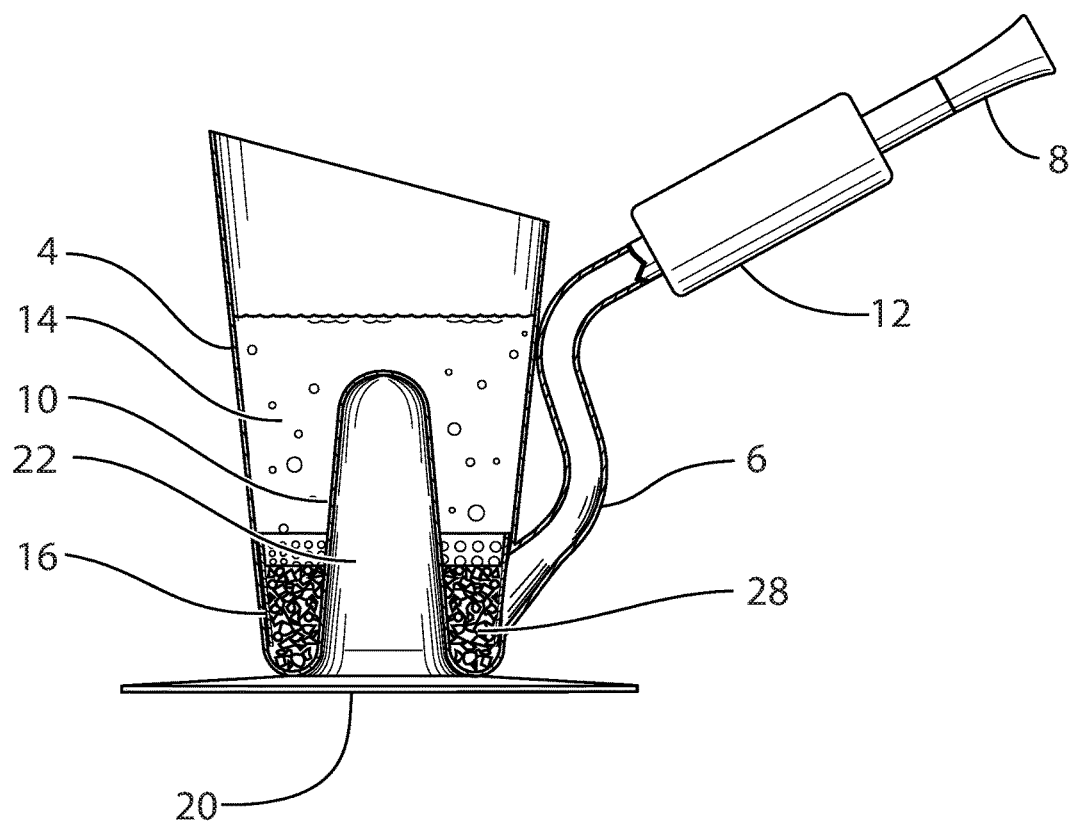
FIG. 5 is a side cut-away view of the brewing and extracting pipe in showing the heated liquid ready to be drawn into the straw through the granules and filter.

The liquid 14 should be allowed to cool to a reasonable drinking temperature, at which point, as shown in FIG. 5, the liquid may be sucked through the straw 6 by the user.

While a preferred method for brewing and extracting a beverage has been described, it will be understand that many possible variations could be used to suit each particular user. For example, some users may find that a single rolling boil is sufficient. They may also decide not to blow air into the vessel 4.

It will also be understood that while a "single use" version of the hand-held brewing and extracting pipe has been described with appropriate quantities, one could scale most of the components of the invention to result in a beverage of sufficient quantity to serve more than one person. The method used to create a beverage would also need to be corresponding adjusted, for example, in the time needed for boiling.

Referring to FIG. 5, the pipe 2 may rest on the stand 20, with the cone 10 positioned over the shaft 28.

The scope of the claims should not be limited by the preferred embodiments set forth in the examples, but should be given the broadest interpretation consistent with the description as a whole.

LIST OF REFERENCES 2 brewing and extracting pipe
4 vessel
6 drinking straw
8 mouthpiece
10 cone
12 insulating piece
14 liquid
16 filter
18 holes
20 base
22 shaft
24 heating source
26 flame
28 granules

We claim:

1. Apparatus comprising a hand-held vessel with a holding straw extending outward from a lower part of the vessel and then upward and outward for brewing and extracting a beverage therein and for drinking the beverage therefrom, wherein the holding straw is connected to the bottom of the hand-held vessel and wherein the holding straw is external to the hand-held vessel, wherein the hand-held vessel with a holding straw further comprises:
    the hand-held vessel having a sloped top and a shaped bottom surface for receiving a quantity of liquid and a quantity of granules;
    wherein the shaped bottom surface of the vessel is substantially an upright inverted conical shape;
    wherein a bottom surface of the vessel is shaped to enable a heater to have better contact with more of a surface area of the vessel;
    the hand-held vessel having the shaped bottom surface adapted for accommodating the heater for bringing the liquid to a boil;
    the holding straw having an end with an aperture connected to the vessel and an opposite end for drinking the beverage;
    a filter positionable in the vessel between the granules and the aperture of the holding straw for preventing the granules from passing through to the aperture and through the holding straw.

2. Apparatus according to claim 1, wherein the filter is a micro-filter.

3. Apparatus according to claim 1, wherein the filter has a plurality of panels, each panel having a plurality of holes with a specific diameter.

4. Apparatus according to claim 1, wherein the filter is a cylindrical ring.

5. Apparatus according to claim 1, wherein the filter is placed adjacent the aperture of the straw and is secured in place.

6. Apparatus according to claim 1, wherein the vessel and the straw are of unitary construction and the straw extends from a sidewall of the vessel.

7. Apparatus according to claim 1, wherein the vessel and the filter are of unitary construction.

8. The apparatus of claim 1, further comprising a stand for supporting the vessel, wherein the stand has a shape complementary to the shaped bottom of the vessel for resting the vessel on the stand.

9. The apparatus of claim 1, wherein the straw further comprises a mouthpiece along the opposite end for drinking the beverage.

10. The apparatus of claim 1, further comprising an insulating piece disposed on the vessel or on the holding straw for holding the vessel when in use.

11. The apparatus of claim 10, wherein the insulating piece is positioned on the holding straw or the vessel.

12. A method comprising:
    providing a hand-held vessel with a holding straw extending from and connected to a lower part of the vessel for brewing and extracting a beverage;
    wherein the providing the hand-held vessel with the holding straw further comprises:

the hand-held vessel having a sloped top and a shaped bottom surface for receiving a quantity of liquid and a quantity of granules;

wherein the shaped bottom surface of the vessel is substantially an upright inverted conical shape;

wherein a bottom surface of the vessel is shaped to enable a heater to have better contact with more of a surface area of the vessel;

the hand-held vessel having the shaped bottom surface adapted for accommodating a heater for bringing the liquid to a boil;

providing the vessel for receiving a quantity of liquid and a quantity of granules;

providing the heater for bringing the liquid in the vessel to a boil and forming the beverage;

providing the holding straw having an aperture connected to the vessel for drinking the beverage from an opposite end of the holding straw, wherein the holding straw is connected to the bottom of the hand-held vessel and wherein the holding straw is external to the hand-held vessel;

providing a filter between the granules and the aperture of the holding straw for ensuring that the granules do not pass through the aperture to the holding straw.

13. The method of claim 12, further comprising:

pouring the liquid into the vessel;

adding the granules;

heating the liquid to the boiling point and forming heated liquid.

14. The claim 13, further comprising:

stirring the liquid.

15. The method of claim 13, further comprising:

drawing the heated liquid through the holding straw.

16. The method of claim 13, further comprising:

blowing air into the liquid by means of the straw.

17. The method of claim 13, further comprising filtering the heated liquid before the liquid is drawn through the straw.

* * * * *